US008100163B2

(12) United States Patent
Nicholson

(10) Patent No.: US 8,100,163 B2
(45) Date of Patent: Jan. 24, 2012

(54) APPARATUS AND METHOD FOR CONTROLLING BARRIER MOVEMENT

(75) Inventor: Scott James Nicholson, New South Wales (AU)

(73) Assignee: Chamberlain Australia Pty Ltd., New South Wales (AU)

( * ) Notice: Subject to any disclaimer, the term of this patent is extended or adjusted under 35 U.S.C. 154(b) by 293 days.

(21) Appl. No.: 12/174,280

(22) Filed: Jul. 16, 2008

(65) Prior Publication Data

US 2010/0013424 A1 Jan. 21, 2010

(51) Int. Cl.

| | |
|---|---|
| ***E05F 15/20*** | (2006.01) |
| ***E06B 9/56*** | (2006.01) |
| ***G05D 3/00*** | (2006.01) |
| ***G05B 5/00*** | (2006.01) |
| ***H02H 7/08*** | (2006.01) |
| ***H02P 1/04*** | (2006.01) |
| ***H02P 3/00*** | (2006.01) |

(52) U.S. Cl. ............................. 160/8; 160/296; 318/466

(58) Field of Classification Search .................. 160/1, 8, 160/9, 188, 296, 298, 310, 311, 180; 188/180, 188/182, 184, 187; 318/466, 468

See application file for complete search history.

(56) References Cited

U.S. PATENT DOCUMENTS

| | | | | |
|---|---|---|---|---|
| 5,253,693 | A | 10/1993 | Marlatt et al. | |
| 5,893,234 | A * | 4/1999 | McKeon | 49/30 |
| 6,029,735 | A | 2/2000 | Nicholson | |
| 6,123,134 | A * | 9/2000 | Thomas et al. | 160/8 |
| 6,223,802 | B1 * | 5/2001 | Colson | 160/84.02 |
| 6,530,863 | B2 * | 3/2003 | Balli et al. | 475/149 |
| 7,610,719 | B2 * | 11/2009 | Hsieh | 49/322 |
| 2004/0112683 | A1 * | 6/2004 | Liebetrau et al. | 187/372 |
| 2005/0099150 | A1 | 5/2005 | Nicholson | |

OTHER PUBLICATIONS http://www.howstuffworks.com/gear5.htm; Howstuffworks "How Gears Work;" I Got Dat Work Ringtone; Mar. 10, 2008.

http://en.wikipedia.org/wiki/worm_gear; Wikipedia, the free encyclopedia; pp. 1-4; Mar. 10, 2008.

* cited by examiner

*Primary Examiner* — Katherine Mitchell
*Assistant Examiner* — Jeremy Ramsey
(74) *Attorney, Agent, or Firm* — Fitch Even Tabin & Flannery

(57) ABSTRACT

An apparatus for controlling the movement of a barrier is provided. The apparatus includes a governor with a preload member. The preload member provides a preload force that releasably and magnetically couples the preload member to the governor. The preload member is configured and arranged to provide a sufficient holding force to the governor in order to hold the barrier in place. The governor is configured and arranged to, upon the preload force being selectively decoupled from the preload member, allow for the downward movement of the barrier while also forming and applying an intentional braking force to the barrier to slow the downward movement of the barrier.

18 Claims, 8 Drawing Sheets

APPARATUS AND METHOD FOR CONTROLLING BARRIER MOVEMENT

FIELD OF THE INVENTION

The field of the invention relates to moveable barrier systems and, more specifically, to controlling the movement of barriers within these systems.

BACKGROUND

Different types of moveable barrier systems have been sold over the years and these systems have been used to control the movement of various types of moveable barriers. For example, garage door operators have been used to move garage doors and gate operators have been used to open and close gates. In another example, fire doors and shutters are closed when a fire occurs in order to contain a fire within a building or other structure.

Previous fire door and fire shutter systems were often configured so that they would naturally close due to the force of gravity. These previous approaches typically provided that the door closed when a fire occurred upon the release of some form of door holding mechanism. Some previous door holding mechanisms were controlled by cables that provided a link to the door and the link was constructed of a material that melted at high temperature. When the link melted, the door holding mechanism released the door and the door fell in a downward direction at a speed of decent controlled by a separate governor that was attached to the barrier.

Other previous fire door and fire shutter systems used a separate control apparatus to control the door release system. In some of these previous systems, this function was performed by a separate electronic device that released a cable (that was attached to the door), while in others of these previous systems, a separate magnetic apparatus released the barrier.

Unfortunately, in all of the above-mentioned previous systems the functions of holding the barrier, releasing the barrier, and controlling movement of the barrier (as the barrier moves in a downward direction) were implemented in separate complicated mechanisms or devices. The use of separate devices to provide each function increased the complexity of the system thereby increasing the maintenance costs and the overall cost of the system. These previous systems also became more difficult to operate as the number of parts and complexity of the individual parts increased.

SUMMARY

Approaches are provided whereby the holding, releasing, and movement halting capabilities of a barrier movement control system are combined into a single apparatus or device. These approaches use a single mechanism to perform these functions, are simple to use, and do not require use of a clutch or similar mechanism. In implementing the functions of the barrier control system in a single apparatus or device, the complexity of the system, cost of the system, and maintenance expenses associated with the system are significantly reduced.

In many of these embodiments, an apparatus for controlling movement of a barrier is provided. The apparatus includes a governor with a preload member. The preload member provides a preload force that releasably and magnetically couples the preload member to the governor. The preload member is configured and arranged to provide a sufficient holding force to the governor in order to hold the barrier in place. The governor is configured and arranged to, upon the preload force being selectively decoupled from the preload member, allow for the downward movement of the barrier while also forming and applying an intentional braking force to the barrier to slow the downward movement of the barrier.

The preload member and the governor can be coupled together using a variety of arrangements and components. In one approach, the preload member and the governor are coupled together via at least one coupling member and at least one magnetic member. In some examples, the coupling member includes at least one lever.

The barrier may be any type of barrier. For example, the barrier may be a rolling garage door, rolling shutters, or a fire door. Other examples of barriers are possible.

In some of these approaches, the magnitude of the preload force is adjustable. For instance, in some of these examples, the governor includes a centrally connected rod and the preload force is adjusted by varying a tension of the centrally connected rod.

The governor may be structured in a variety of different ways and, in one example, may include a first centripetal member (e.g., a first centripetal weight), a second centripetal member (e.g., a second centripetal weight), and at least one brake pad. In this example, the first centripetal member and the second centripetal member are configured and arranged to form the braking force. The one or more brake pads are configured and arranged to receive the braking force and responsively slow the downward movement of the barrier. The first centripetal member and the second centripetal member are configured and arranged to form the braking force when speed of the downward movement of the barrier exceeds a predetermined threshold.

In others of these embodiments, a barrier position is secured by a governor using a preload force to responsively cause a barrier to be held in place in the open position. The preload force is released from the governor and this release responsively allows the barrier to travel in a downward movement. The speed of the barrier is sensed and when speed of the barrier exceeds a predetermined threshold while traveling in the downward movement, a braking force in the governor is created and applied to the barrier so as to slow the speed of the barrier.

The preload force may be transferred by a preload member. The governor may be magnetically coupled to the preload member. In some examples, the preload force may be adjusted. In other examples, the barrier may be returned to the open position. In still other examples, the holding force may be adjusted to be large enough to hold the barrier in place but small enough to be overcome by a force provided by a driving element. The driving element may be any variety of elements such as a manual hoist or a motor.

Thus, approaches are provided whereby the holding, releasing, and movement halting capabilities of a barrier movement control system are combined into a single apparatus. These approaches are simple to use and employ a single brake and no clutch. In combining the functions of the barrier control system in a single apparatus, the complexity of the system, cost, and maintenance expenses associated with the system are significantly reduced.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
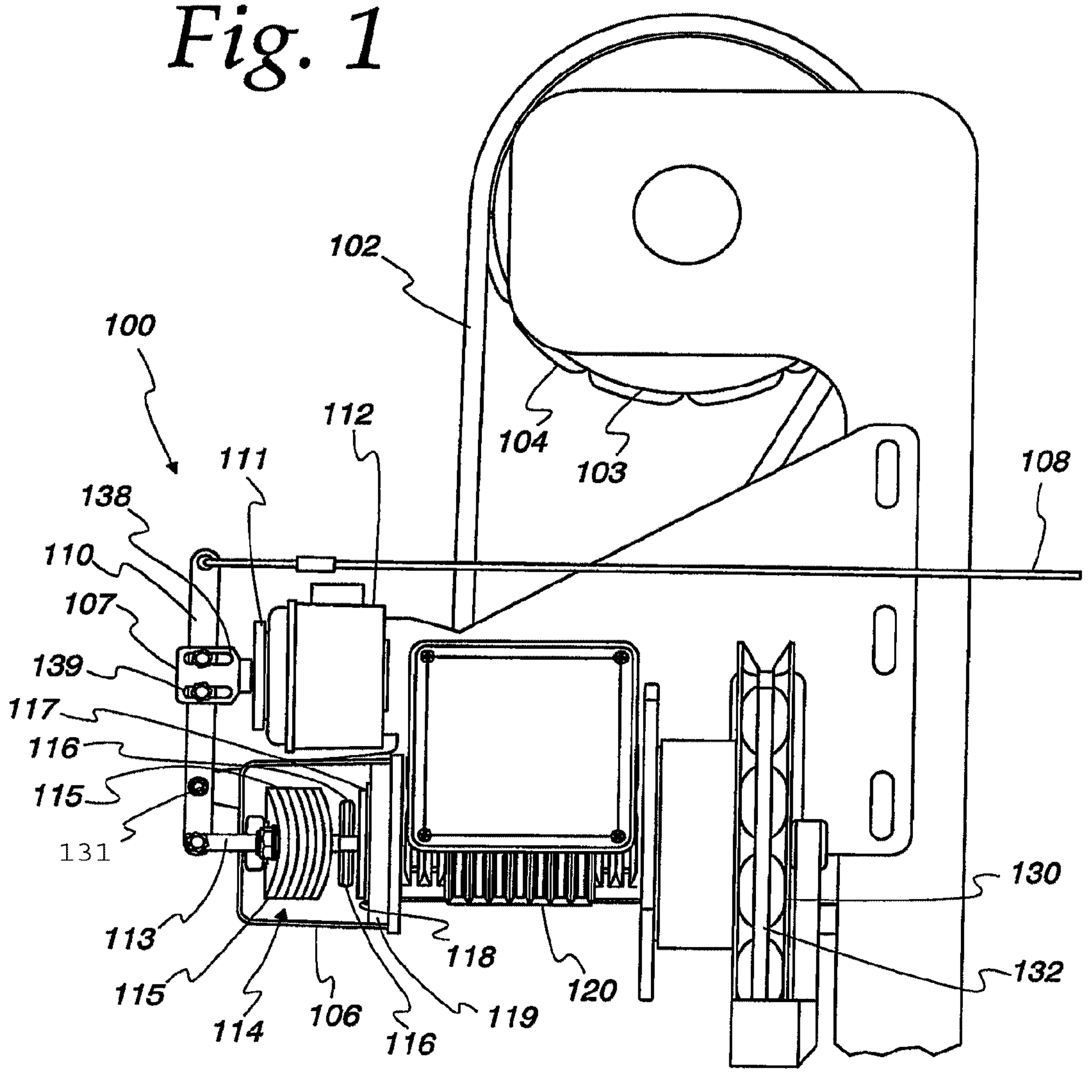
FIG. 1 comprises a right side view of the moveable barrier apparatus according to various embodiments the present invention.
Figure 2:
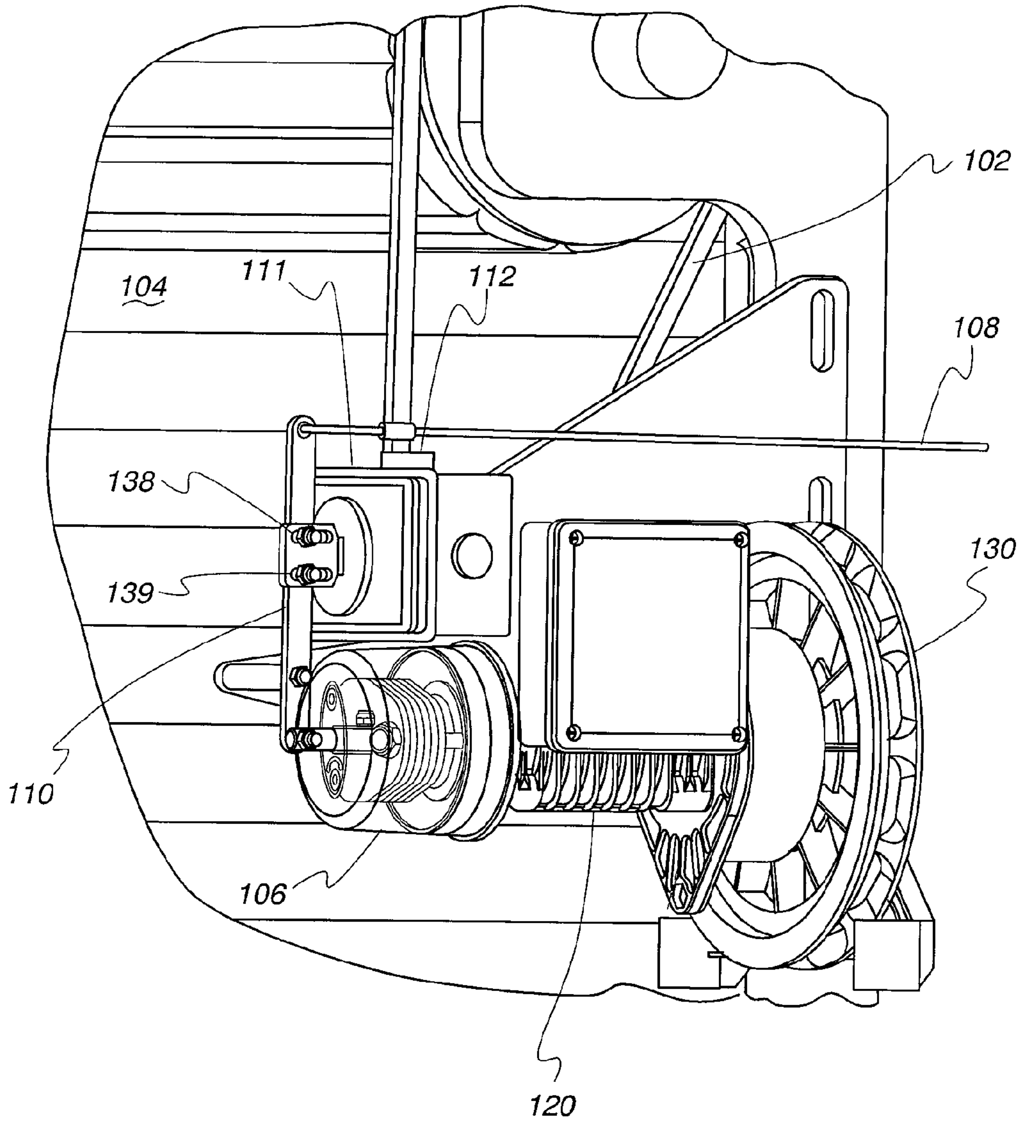
FIG. 2 comprises a right side perspective view of the moveable barrier apparatus of FIG. 1 according to various embodiments of the present invention.
Figure 3:
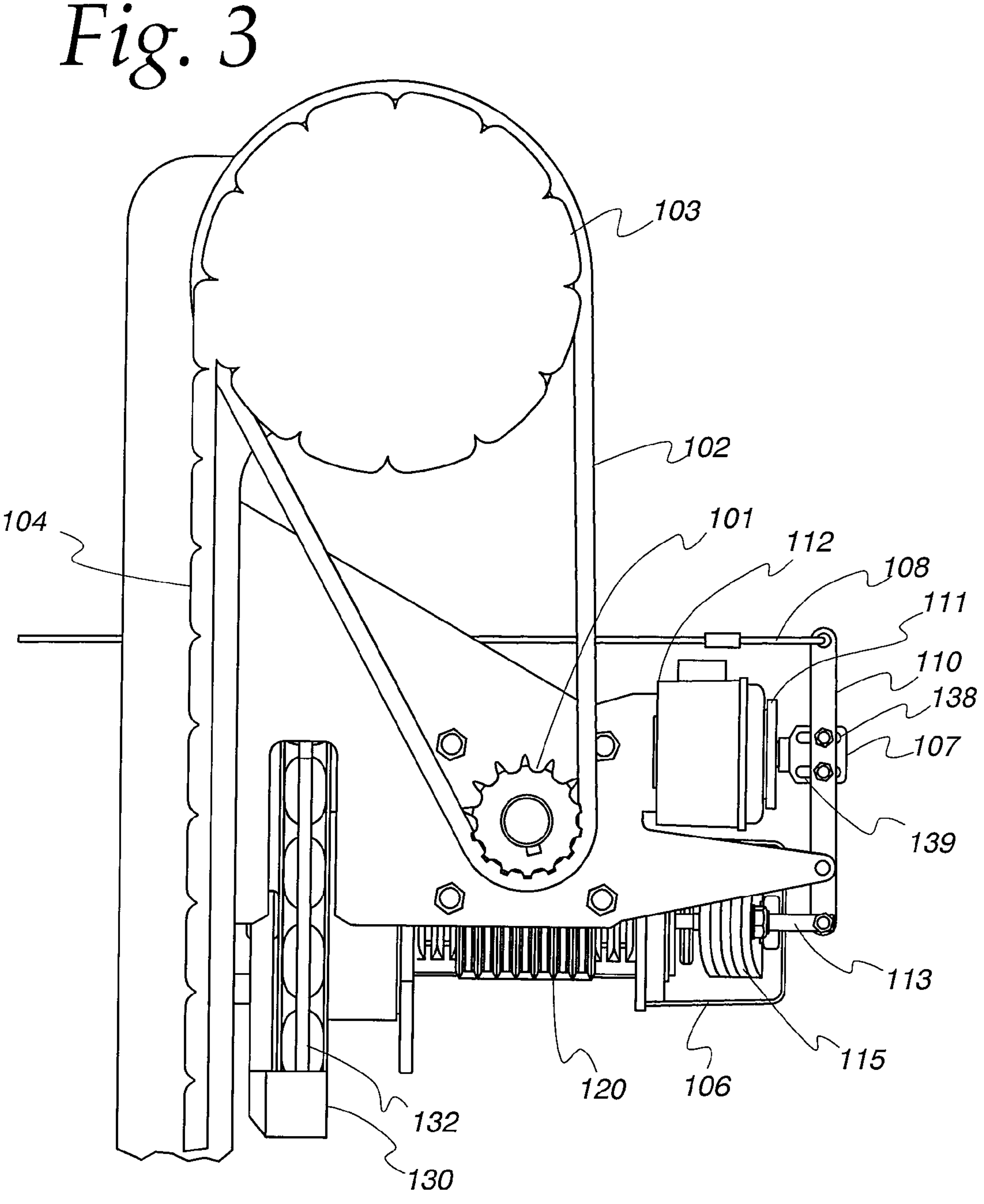
FIG. 3 comprises left side view of the moveable barrier apparatus of FIGS. 1 and 2 according to various embodiments of the present invention.
Figure 4:
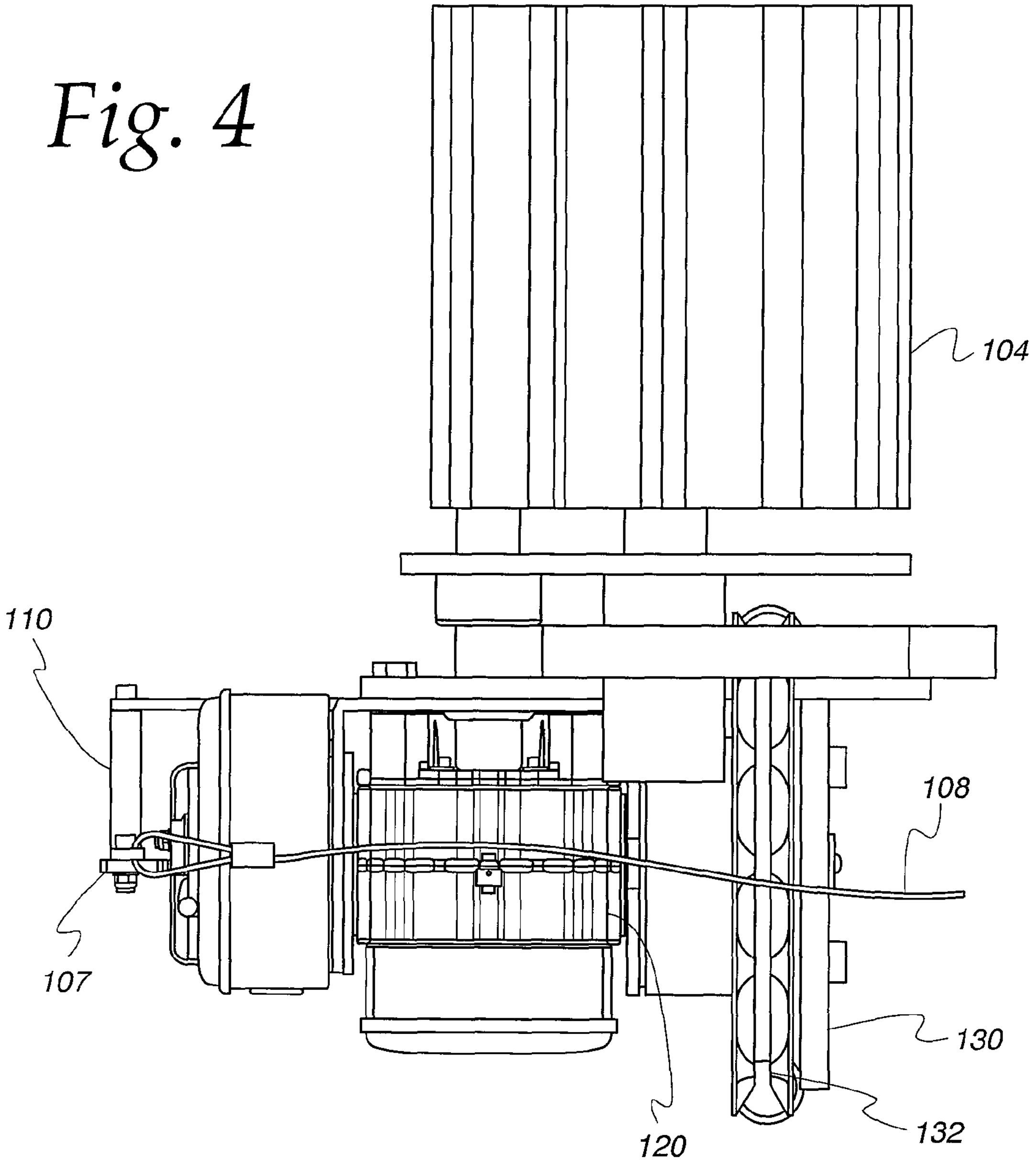
FIG. 4 comprises a top view of the moveable barrier apparatus of FIGS. 1-3 according to various embodiments of the present invention.

Referring collectively now to FIGS. 1-4, one example of a single moveable barrier apparatus 100 that controls the movement of a barrier is described. In the examples that are described herein, the barrier is described as being a rolling door such as a fire door or the like. However, it will be appreciated that the approaches described herein can be extended and used with other types of barriers and can be used for a variety of purposes as well.

The moveable barrier apparatus 100 includes a gear 101 that alternatively drives or is driven by a belt 102. The movement of the belt 102 rotates a rotatable cylinder 103 that, in turn, responsively moves a rolling door 104. More specifically, the rotation of the rotatable cylinder 103 in one direction causes the rolling door 104 to move in an upward direction while the rotation of the rotatable cylinder 103 in the opposite direction causes the rolling door 104 to move in a downward direction.

A coupling arm or rod 110 is centrally connected between a magnetic plate 111 and a governor 114. The magnetic plate 111 can be held in place by an electromagnet 112. The coupling arm 110 is connected to the magnetic plate 111 by an adjustment bracket 107. The coupling arm 110 is connected to a fulcrum 131. The other end of the coupling arm 110 is connected to a preload member 113. The position of the preload member 113 adjusts the holding force. Adjustment bracket 107 allows for adjustment of the distance between the plate 111 and the coupling arm 110. In this regard, the bracket 107 moves within slots 138 and 139 thereby moving the magnetic plate 111 and varying the distance between the magnetic plate 111 and the coupling arm 110. By adjusting the distance between the magnetic plate 111 and the coupling arm 110, the position of the preload member 113 is also adjusted and, therefore, the holding force is adjusted. In some examples, a wire or cable 108 is connected to the coupling arm 110 and is used to apply tension to the position of the magnetic plate 111 as an alternate or a supplement to the forces supplied by the electromagnet 112.

The electromagnet 112 may be any suitable electromagnet, combination of magnets or electromagnets, or any type of magnetic device that is securable to another component. The coupling arm or rod 110 may be composed of metal or a similar strong material and is configured to be attached to the electromagnet 112 with the adjustment bracket 107.

The above-described elements act to regulate the movement of the rolling door 104 in a variety of ways. For example and as described in greater detail herein, the force provided by the preload member 113 is sometimes used to hold the rolling door 104 in place. Under these circumstances, the electromagnet 112 attaches to the magnetic plate 111 which holds the bracket 107 at a specific distance which is translated by the fulcrum 131 to a specific location for the preload member 113 (via the bracket or lever 107) and the force supplied by the preload member 113 holds the door in place via the preload member 113 applying the preload force to the governor 114.

Other configurations of the system allow free movement of the rolling door 104. More specifically and as also described in greater detail herein, the functions provided by the electromagnet 112 may be supplemented or replaced by the wire 108. The wire 108 holds the magnetic plate 111 in the same position that the electromagnet 112 would hold the plate. This allows either the electromagnet 112 or the wire 108 to keep the preload on the governor. When both the wire 108 and the electromagnet 112 are released, the rolling door 104 is free to move in a downward direction.

In other examples, and also as described in greater detail herein, the speed of the rolling door 104 may be regulated. More specifically, as the rolling door 104 moves downward, its speed or acceleration may reach a level where it would be desirable to slow and/or halt the movement of the rolling door 104. In this case, action by components of the governor 114 slows the movement of the rolling door 104 and may eventually halt its movement.

The preload member 113 surrounds and receives a rotating governor member 121. The force arm 113 and rotating governor member 121 are constructed of any suitable material such as metal or plastic or the like.

Figure 5:
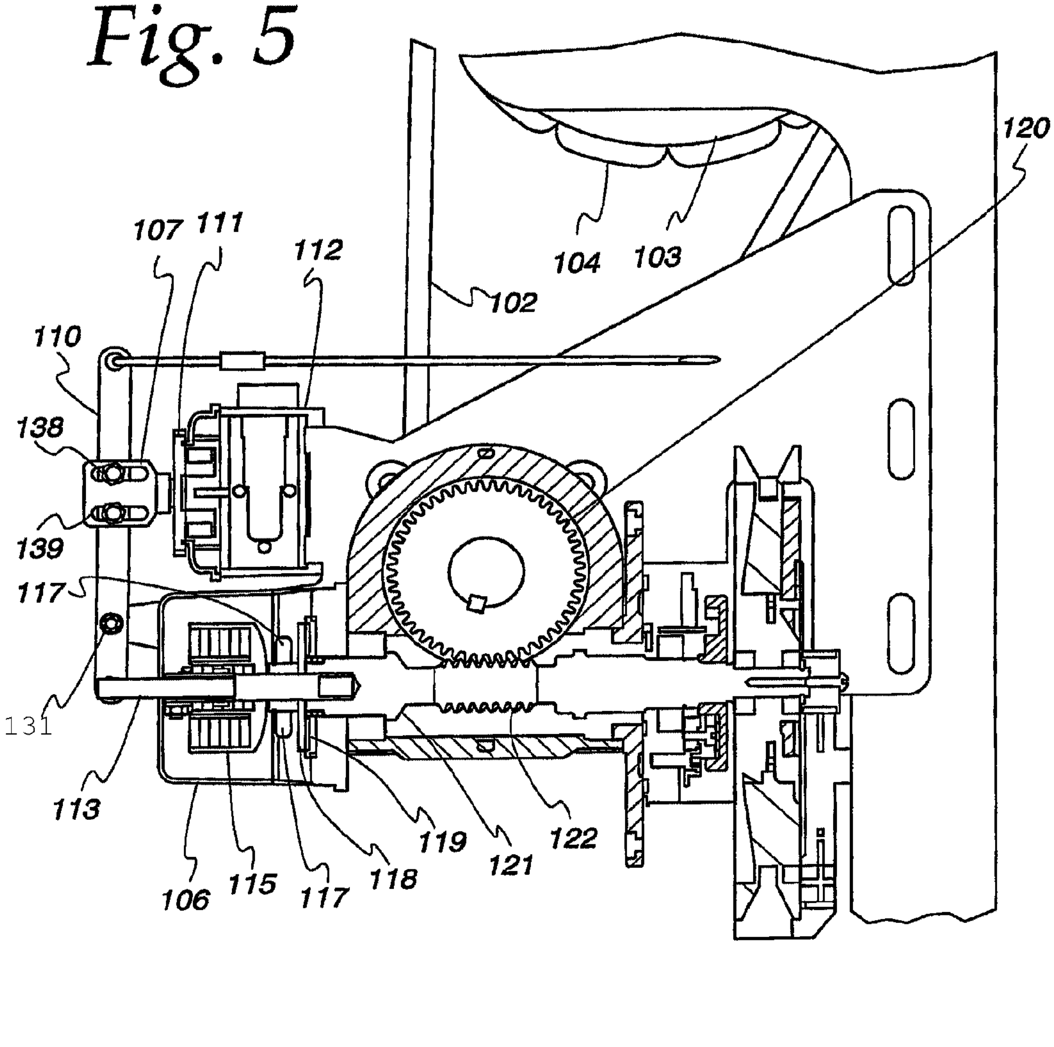
FIG. 5 comprises a cut-away right side view of the moveable barrier apparatus of FIGS. 1-4 according to various embodiments of the present invention.
Figure 6:
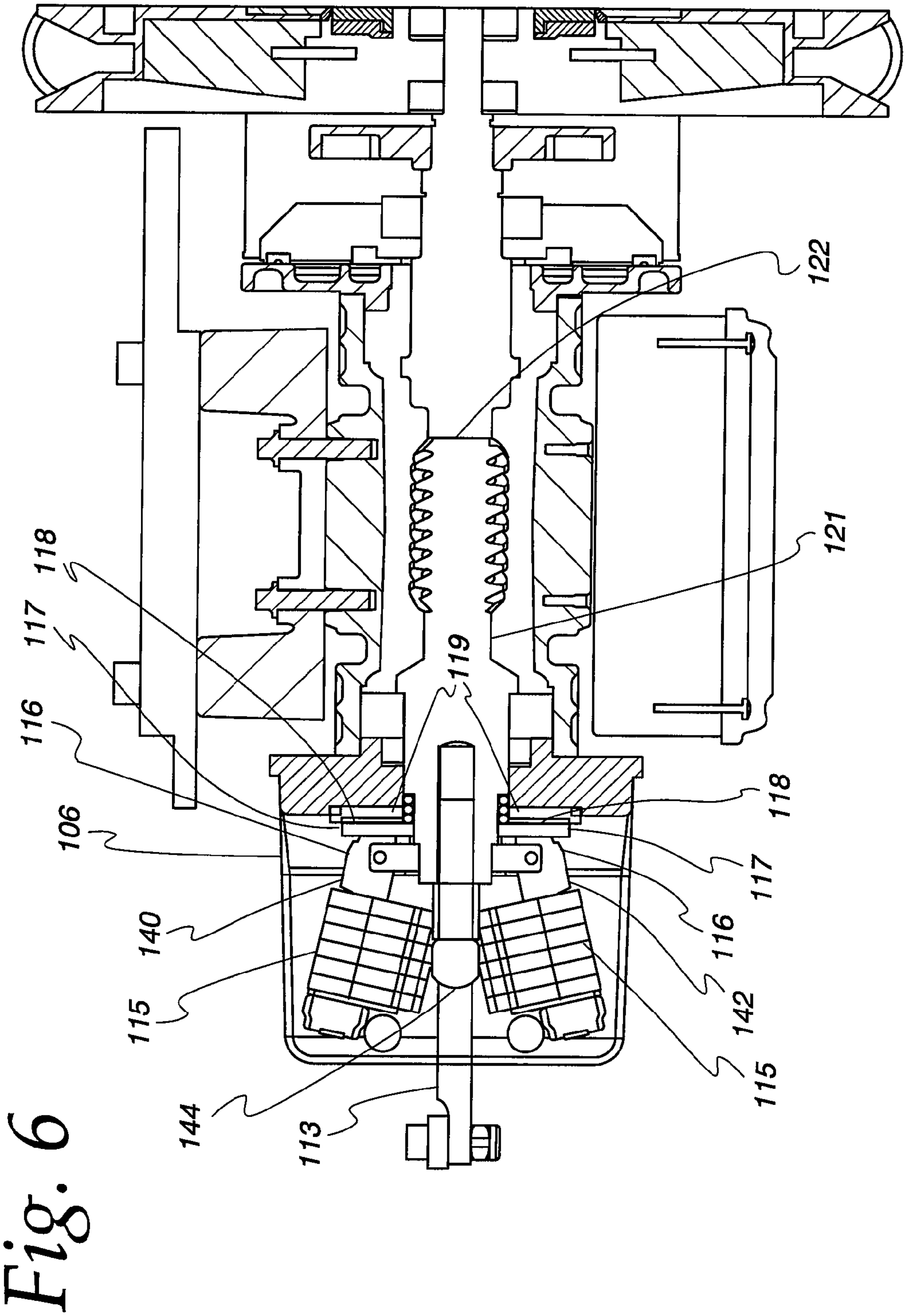
FIG. 6 comprises a perspective view of the moveable barrier apparatus of FIGS. 1-5 according to various embodiments of the present invention.
Figure 7:
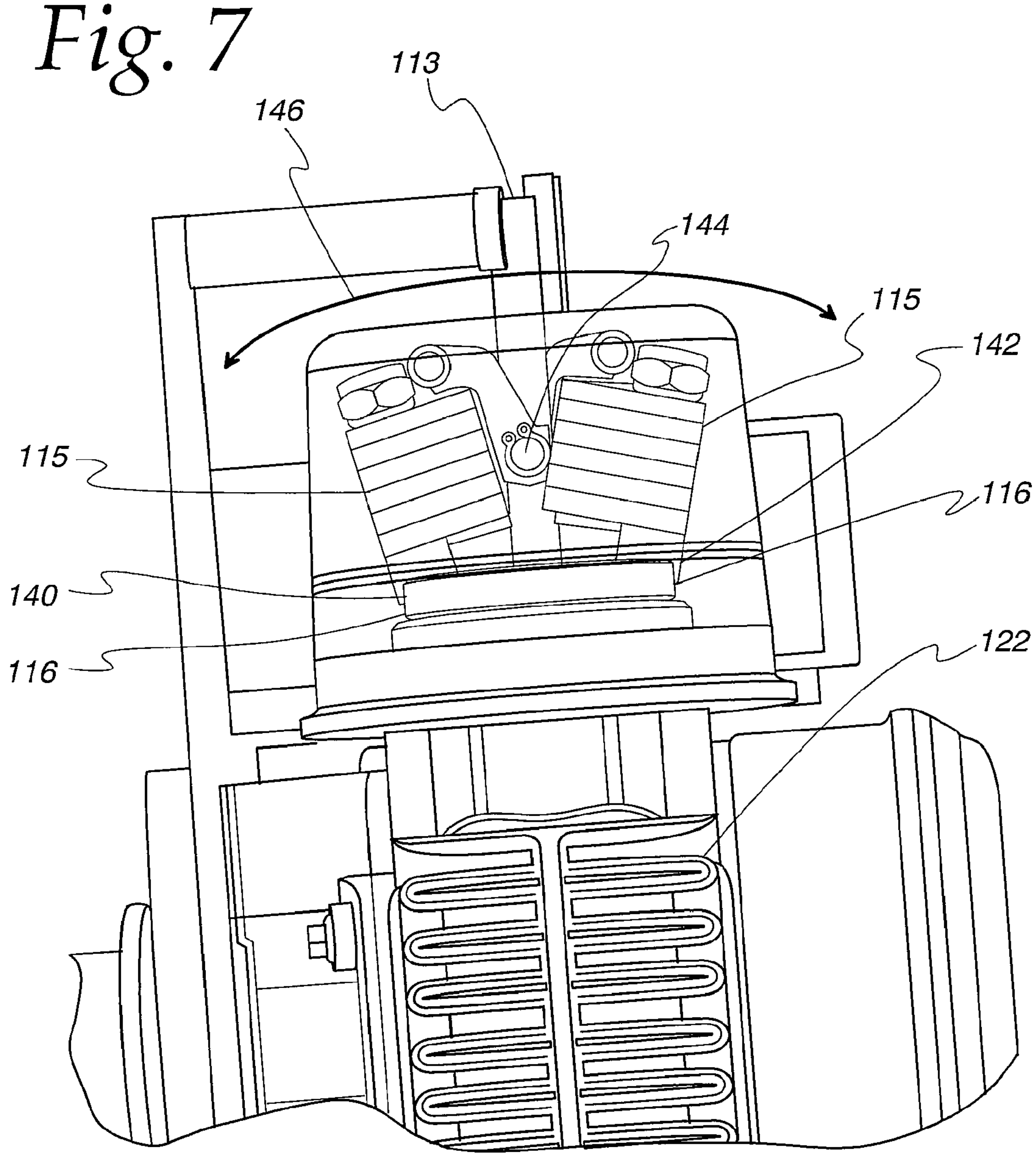
FIG. 7 comprises a perspective view of the moveable barrier apparatus of FIGS. 1-6 according to various embodiments of the present invention.
Figure 8:
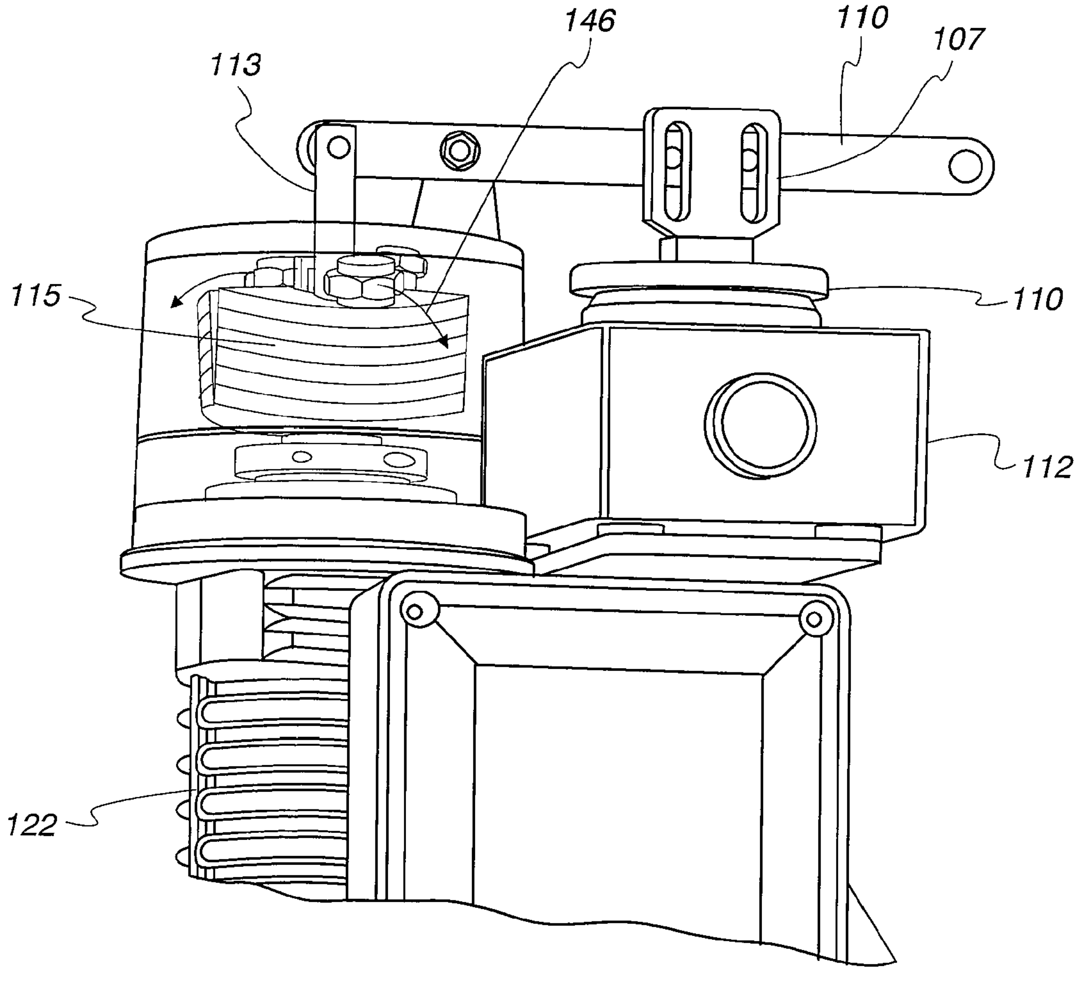
FIG. 8 comprises a perspective view of the moveable barrier apparatus of FIGS. 1-7 according to various embodiments of the present invention.

Referring now collectively to FIGS. 1-8, the governor 114 includes centripetal weights 115, cams 116, a moving plate 117, brake pads 118, and a stationary plate 119. These components are surrounded by a cover 106. The brake pads 118 are positioned between the moving plate 117 and the stationary plate 119. The centripetal weights 115 and cams 116 are attached to a first governor arm 140 and a second governor arm 142 and together rotate about the rotating member 121. The first governor arm 140 and a second governor arm 142 are connected at a knuckle joint 144 and pivot symmetrically about the rotating governor member 121.

The centripetal weights 115 and cams 116 may be constructed from any suitable metal or similarly suitable material and move outward due to the speed that the governor 114 is rotating. This outward movement causes the moving plate

117 to press against the brake pads 118 and the brake pads 118 apply a thrust or braking force to the stationary plate 119. In other words, the brake pads 118 are applied against the stationary plate 119 to eventually halt the movement of the rotatable cylinder 103. Consequently, when the first governor arm 140 and second governor arm 142 extend outward, a braking force is applied to the rolling door 104.

A worm wheel 120 interacts with a worm 122. More specifically, as the worm wheel 120 turns, it rotates the worm 122, which in turns rotates the rotating governor member 121. The worm 122 is coupled to or coextensive with the rotating governor member 121. As described herein, when the speed of rotation increases above a threshold value, the first governor arm 140 and second governor arm 142 are extended outward. As the first governor arm 140 and the second governor arm 142 extend outward, the centripetal weights 115 also move outward and the cams 116 apply a force to the moving plate 117. The moving plate 117 applies pressure on the brake pads 118. The brake pads 118 slow the movement of the rotating governor member 121. Through the worm 122, this action slows and may eventually halt the movement of the worm wheel 120, which in turn halts the movement of the rolling door 104.

The worm 122 and worm wheel 120 may be any standard worm and worm wheel. As an example, the reduction worm 122 and worm wheel 120 may be the reduction worm and worm wheel found in the Chamberlain Model PD612D garage door operator manufactured by the Chamberlain Group, Inc. of Elmhurst Ill.

When the rolling door 104 needs to be reopened, the preload member 113 is reset (i.e., the magnet 111 is detached or the holding force overcome) and a person can use a chain hoist 132 to pull the rolling door 104 into an open position. Alternatively, a motor may be used rather than manual force.

In one example of the operation of the system of FIGS. 1-8, the rolling door 104 is held in place. The electromagnet 112 attaches to the preload member 113. The preload member 113 is pulled outward and the preload member 113 applies a force to the brake pads 118. The force applied to the brake pads 118 prevents rotation of the rotating governor member 121 which ensures that the worm 122 can not turn. The prevention of rotation of the worm 122 in turn prevents rotation of the worm wheel 120. This action holds the worm wheel 120 in place. Since the worm wheel 120 does not move, the belt 102 does not move and the rolling door 104 can not move. Consequently, the rolling door 104 is held in place.

The amount of preload force can be adjusted. In one example, the amount of force can be set to a level that holds the rolling door 104 in place but which also allows a person to hoist the barrier into the open position. Adjustment of the preload force can be accomplished by adjusting the distance between the magnetic plate 111 and the coupling arm 110. By adjusting the distance between the magnetic plate 111 and the coupling arm 110, the position of the preload member 113 is changed.

In another example of the operation of the system of FIGS. 1-8, the rolling door 104 is allowed to move in a downward direction. In this case, the magnet plate 111 is released from the electromagnet 112. This can be accomplished by removing the current in the electromagnet 112 and releasing the wire 108. With no preload force holding the governor 114 (and hence preventing rotation of the rolling door 104), the rolling door 104 is free to move in a downward direction as no force is applied to the brake pads 118.

In another example of the operation of the system of FIGS. 1-8, as the rolling door 104 moves, an excess speed is achieved. The excess speed may be determined when the cams 116 begin to apply a braking force. This, in turn, may be determined and adjusted according to a variety of factors such as the size and weight of the centripetal weights 115 and/or the dimensions of the first and second governor arms 140 and 142.

As the speed of the rolling door 104 reaches and exceeds a threshold value, the centripetal weights 115 (on the first governor arm 140 and second governor arm 142) are centripetally influenced outward due to the speed that the governor 114 is rotating. The cams 116 move inward causing the moving plate 117 to press against the brake pads 118 and apply a braking force to the stationary plate 119. The stationary plate 119 is attached to the rotatable cylinder 103 and the action of the brake pads 118 halts the movement of the rotatable cylinder 103.

In still another example of the operation of the system of FIGS. 1-8, manual actuation of the rolling door 104 may be accommodated. A hoist wheel 130 attaches to a hoist chain 132. As the hoist chain 132 is pulled by a user, the hoist wheel 130 is rotated, which in turn rotates the rotating governor member 121. This causes the worm 122 to rotate which in turn rotates the worm wheel 120. As has been described elsewhere herein, this action causes the movement of the rolling door 104, this time in an upward direction. As also mentioned, the amount of holding force used to keep the rolling door 104 in place can be set to a level that holds the rolling door 104 in place but which also allows a person to overcome the holding force and hoist the barrier into the open position. The holding force may also be released to allow manual opening of the rolling door 104, for instance, by a chain or rope. In still other examples, a motor may be used instead to hoist the rolling door 104.

Referring now especially to FIGS. 5-8, one example of decelerating the rolling door 104 is described. As the speed of the door increases above a threshold, the centripetal weights 115 are centripetally influenced outward in a direction indicated by arrows 146 due to the speed that the governor 114 is rotating about the rotating governor member 121. The cams 116 move outward and cause the moving plate 117 to press against the brake pads 118. This action applies a braking force to the stationary plate 119 thereby halting the movement of the rotating governor member 121.

Thus, approaches are provided whereby the holding, releasing, and movement halting capabilities of a barrier movement control system are combined into a single apparatus. These approaches are simple to use and use a single brake and no clutch. In combining the functions of the barrier control system in a single apparatus, the complexity of the system, cost, and maintenance expenses associated with the system are significantly reduced.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. An apparatus for controlling movement of a bather, the apparatus comprising:

a rotatable governor member, the rotatable governor member including a worm that engages and drives a worm wheel, the bather being configured to be moved in response to turning of the worm wheel;

a preload member configured to be biased by a biasing member, the preload member configured to, in response to being biased by the biasing member, apply a sufficient preload holding force onto the rotatable governor member via a braking arrangement that operates during operation of a governor associated with the rotatable governor member to prevent rotation of the rotatable governor member and the worm wheel, the prevention of rotation of the rotatable governor member and the worm wheel being sufficient to prevent movement of the bather, and wherein in response to the preload holding force being not provided to the preload member by unbiasing the biasing member from the preload member, the rotatable governor member is configured to release the worm and worm wheel to rotate and allow downward movement of the barrier while at the same time the braking arrangement of the rotatable governor member is configured to apply an intentional braking force to the rotatable governor member to slow rotation of the rotatable governor member to responsively slow the rotation of the worm wheel and the downward movement of the bather.

2. The apparatus of claim 1 wherein the preload member and the rotatable governor member are coupled together via at least one coupling member and at least one magnetic member.

3. The apparatus of claim 2 wherein the at least one coupling member comprises at least one lever.

4. The apparatus of claim 1 wherein the barrier is selected from a group consisting of: a rolling garage door and rolling shutters.

5. The apparatus of claim 1 wherein the sufficient preload holding force is adjustable.

6. The apparatus of claim 5 wherein the governor comprises a centrally connected rod and the sufficient preload holding force is adjusted by varying a tension of the centrally connected rod.

7. The apparatus of claim 1 wherein the braking arrangement of the rotatable governor member is configured to apply the intentional braking force in response to the speed of the downward movement of the bather exceeding a predetermined threshold.

8. A method for controlling movement of a bather, the method comprising:

biasing a preload member with a biasing member;

applying a sufficient preload holding force onto a rotatable governor member via a braking arrangement that operates during operation of a governor associated with the rotatable governor member so as to prevent rotation of the rotatable governor member, a worm that engages the rotatable governor member, and a worm wheel that engages the worm, the prevention of rotation of the rotatable governor member and the worm wheel sufficient to prevent movement of the bather;

unbiasing the preload member from the biasing member;

allowing the rotatable governor member to release the worm wheel to cause a downward movement of the barrier;

when the speed of the barrier exceeds the predetermined threshold, creating intentional braking force using the braking arrangement of the rotatable governor member and applying the intentional braking force to the rotatable governor member so as to slow the rotation of the worm wheel and reduce the speed of the barrier.

9. The method of claim 8 further comprising adjusting the preload holding force.

10. The method of claim 8 further comprising returning the barrier to an open position.

11. The method of claim 8 further comprising adjusting the preload holding force to be large enough to hold the barrier in place but small enough to be overcome by a force provided by a driving element.

12. The method of claim 11 wherein the driving element comprises a manual hoist.

13. The method of claim 11 wherein the driving element comprises a motor.

14. The method of claim 8 wherein the barrier comprises a fire door in a building.

15. The apparatus of claim 1 wherein the biasing member is selected from a group consisting of: a magnet coupling, a wire or cable coupling, and combinations thereof.

16. The method of claim 8 wherein the biasing a preload member with a biasing member comprises biasing the preload member with a biasing member selected from a group consisting of: a magnet coupling, a wire or cable coupling, and combinations thereof.

17. An apparatus for controlling movement of a bather, the apparatus comprising:

a rotatable governor member;

a preload member configured to be biased by a biasing member, the preload member configured to, in response to being biased by the biasing member, apply a sufficient preload holding force onto the rotatable governor member via a braking arrangement that operates during operation of a governor associated with the rotatable governor member to prevent rotation of the rotatable governor member, the prevention of rotation of the rotatable governor member being sufficient to prevent movement of the barrier; and wherein in response to the preload holding force being not provided to the preload member by unbiasing the biasing member from the preload member, the rotatable governor member is configured to allow downward movement of the barrier while at the same time the braking arrangement of the rotatable governor member is configured to apply an intentional braking force to the rotatable governor member to slow rotation of the rotatable governor member to responsively slow the downward movement of the barrier.

18. The apparatus of claim 17 further comprising: a worm configured to rotate with the rotatable governor member and that engages and drives a worm wheel, the barrier being configured to be moved in response to turning of the worm wheel.

* * * * *

UNITED STATES PATENT AND TRADEMARK OFFICE

CERTIFICATE OF CORRECTION

PATENT NO. : 8,100,163 B2
APPLICATION NO. : 12/174280
DATED : January 24, 2012
INVENTOR(S) : Scott James Nicholson It is certified that error appears in the above-identified patent and that said Letters Patent is hereby corrected as shown below:

IN THE CLAIMS

Column 6, Claim 1, Line 58: Change “bather,” to -- barrier, --;

Column 6, Claim 1, Line 62: Change “bather” to -- barrier --;

Column 7, Claim 1, Line 7: Change “bather,” to -- barrier, --;

Column 7, Claim 1, Line 18: Change “bather.” to -- barrier. --;

Column 7, Claim 7, Line 37: Change “bather” to -- barrier --;

Column 7, Claim 8, Line 39: Change “bather,” to -- barrier, --;

Column 7, Claim 8, Line 49: Change “bather;” to -- barrier; --;

Column 7, Claim 8, Line 53: Change “bather;” to -- barrier; and --; and

Column 8, Claim 17, Line 27: Change “bather,” to -- barrier, --.

Signed and Sealed this
Twelfth Day of June, 2012

David J. Kappos
*Director of the United States Patent and Trademark Office*